Figure 1:
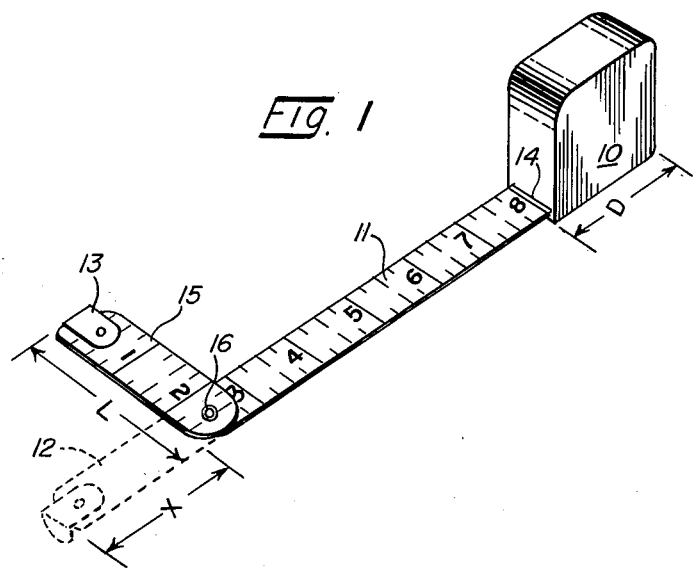

April 30, 1963 C. G. BETZ 3,087,251
TAPE RULE
Filed Jan. 15, 1962

INVENTOR.
Clarence G. Betz
BY
*B. B. Olive*
ATTORNEY

United States Patent Office 3,087,251
Patented Apr. 30, 1963

3,087,251
TAPE RULE
Clarence G. Betz, Berkeley, Calif., assignor to H. K. Porter Company (Delaware), Danville, Va., a corporation of Delaware
Filed Jan. 15, 1962, Ser. No. 166,249
1 Claim. (Cl. 33—138)

This invention is concerned with a tape rule of the type having housing in which the tape is stored in rolled form and has as its object the provision of a tape rule of this kind which is adapted to give direct readings of inside measurements. In a tape rule of kind mentioned, it is customary to find some notation on the usual D-shaped housing such as "add two inches for inside measurements." For example, when a carpenter uses such a rule to measure the inside dimensions of a door frame, he holds the outside of the rule housing against one side of the frame and then extends the zero end of his rule until it touches the opposite side. The carpenter then reads the rule at the housing slot and to this reading he adds two inches or whatever extra amount is indicated to account for the length of the rule housing. While inside dimensions can be measured accurately with such tape rules, the length of the housing must always be accounted for since inherently, no inside measurement can be read directly off the rule. Aside from the time required to correct inside readings, carpenters and other tradesmen frequently forget to add the correcting dimension and thus waste materials and additional time.

In the present invention, there is provided a tape rule that can be read directly when taking inside dimensions. This is accomplished by pivotally mounting a length of the zero end of the rule which can be pivoted out of the way when taking inside dimensions and will thereby compensate for the length of the housing. When outside dimensions are being taken, the rule is used fully extended. However, when inside measurements are being taken, the pivoted zero end section is rotated ninety degrees with respect to the main body of the rule which, in effect, shortens the rule by the length of the housing. Stated differently, the rule reading is increased by an amount equal to the length of the housing. With the rule so arranged, it thus becomes possible to read inside measurements directly off the rule at the housing slot.

Figure 2:
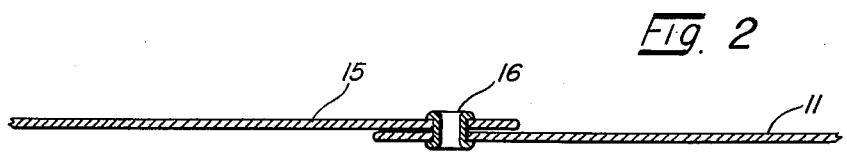
Figure 3:
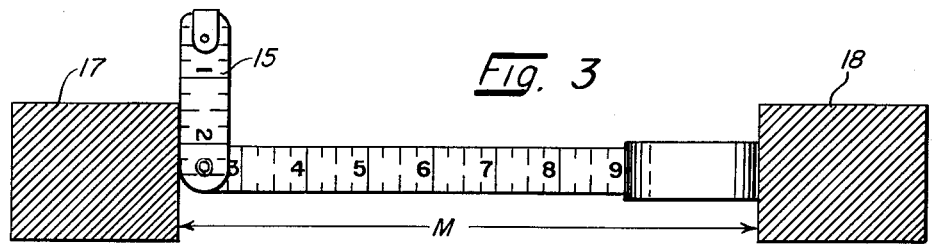
Figure 4:
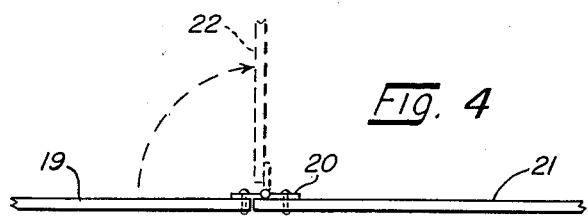

The invention is now more fully described in the description following, and in the drawings, in which:

FIGURE 1 is a perspective view of the rule.
FIGURE 2 is an enlarged partially cut away cross section elevation of the rule end.
FIGURE 3 is a plan view showing the rule in use; and
FIGURE 4 is a perspective of an alternative embodiment showing the zero end hinged.

As seen from the drawings, the rule includes the usual D-shaped housing 10 from which extends the flexible tape generally indicated at 11 and on which the measuring indicia are imprinted. In normal use for measuring outside dimensions the tape 11 will be extended as indicated by the dotted lines 12 and in the usual way the clip 13 will be employed over the board or other object being measured to retain the rule end and the particular outside dimension will then be read off the rule. As to taking outside dimensions, the rule of the invention thus operates in a conventional way.

Referring again to the drawings and to the matter of measuring inside dimensions, the length of the housing is indicated by the dimension D. It is this dimension D, usually fixed at two inches, that is added to the rule reading at the housings slot, indicated at 14, whenever inside dimensions are being measured with the conventional tape rule. The rule of the invention however eliminates the need for this correction by providing for a length of the rule end indicated by 15 and of length L to be pivoted by suitable means such as the rivet 16 such that when in pivoted position, the rule is, in effect, shortened by the indicated amount X equal to the dimension D.

In FIGURE 3 an illustration is given of how the rule of the invention is actually used in a specific situation. In this figure, 17 and 18 represent cross sections of two framing studs and it is desired to know the inside dimension M between the inside surfaces of the studs. To make this measurement, the pivoted end 15 of the rule is moved from its normal extended position indicated by dotted lines 12 to the ninety degree position indicated in FIGURES 1 and 3. With the rule in this position, the housing 10 is butted against the stud 18 and the rule end, with the pivoted zero end 15 turned out of the way, is extended until it abuts stud 17. Since the rule reading is now automatically increased by the amount X equal to housing length D, the dimension M will be indicated directly by observing the rule reading at the housing slot.

Given the concept of providing connection means to effectively shorten the zero end sufficiently to compensate for the housing length when taking inside measurements, it is obvious that the concept may be carried out in other ways. For example, FIGURE 4 represents one such embodiment in that the required zero end length indicated at 19 is connected by a hinge 20 to the main body of the rule 21 such that the zero end length can be tilted to the dotted line position 22. While not shown, it is also apparent that rivet 16 could be replaced by suitable snap fastening means so that the pivoted end 15 could be removed from the main body of the rule. These and other embodiments will appear to those skilled in the art without departing from the spirit of the invention as hereafter defined in the claim.

Having described my invention, what I claim is:

A coilable rule comprising a flexible measuring tape, a housing arranged to coilably receive the tape, said housing characterized by having opposed flat end surfaces and a slot at the base of one end surface through which said tape may be withdrawn and at which inside dimensions may be read, a measuring scale on said tape extending from the zero free end, a pivotal connection effective to divide the tape into pivoted short and long sections and serving as the sole means for securing the two sections together, said scale including indicia on each section on either side of and in cooperating relationship at said connection such that when said sections are aligned said rule may be used for measuring outside dimensions in the normal manner, said short section being of a length including said zero end such that when folded rearwardly said tape is shortened in an amount exactly equal to the distance between said housing end surfaces, said rule thereby being adapted to give direct inside dimension readings by abutting the free end of the shortened tape and the housing outside end surface against the respective inside surfaces being measured and reading the inside dimension directly at said slot.

References Cited in the file of this patent
UNITED STATES PATENTS
2,156,905    Stowell et al. _____ May 2, 1939